United States Patent [19]
Kuroda et al.

[11] Patent Number: 5,260,926
[45] Date of Patent: Nov. 9, 1993

[54] ATOMIC FORCE MICROSCOPE WITH A PLURALITY OF CANTILEVERS FOR RECORDING/REPRODUCING INFORMATION

[75] Inventors: Ryo Kuroda, Machida; Toshihiko Miyazaki, Hiratsuka; Kunihiro Sakai; Kiyoshi Takimoto, both of Isehara, all of Japan

[73] Assignee: Canon Kabushiki Kaisha, Tokyo, Japan

[21] Appl. No.: 870,335

[22] Filed: Apr. 17, 1992

[30] Foreign Application Priority Data

Apr. 22, 1991 [JP] Japan .................... 3-116545

[51] Int. Cl.$^5$ ................... G11B 7/00; G11B 9/00
[52] U.S. Cl. ................... 369/100; 369/126; 250/306; 250/442.11
[58] Field of Search ............ 369/100, 126, 44.11, 369/44.26, 101, 120; 250/306, 309, 307, 442.11

[56] References Cited

U.S. PATENT DOCUMENTS

| | | | |
|---|---|---|---|
| 5,051,379 | 9/1991 | Bayer et al. | 250/306 |
| 5,065,103 | 11/1991 | Slinkman et al. | 250/306 |
| 5,144,128 | 9/1992 | Hasegawa et al. | 250/307 |
| 5,155,715 | 10/1992 | Ueyema et al. | 250/307 |
| 5,166,520 | 11/1992 | Prater et al. | 250/306 |
| 5,187,367 | 2/1993 | Miyazaki et al. | 250/306 |

FOREIGN PATENT DOCUMENTS 4-115103 4/1992 Japan .

OTHER PUBLICATIONS

Binnig et al., "Atomic Force Microscope," *Physical Review Letter*, vol. 56, No. 9, p. 930 (1986).
Staufer et al., "Nanometer Scale Structure Fabrication with the Scanning Tunneling Microscope," *Applied Physics Letters*, vol. 51, No. 4. p. 244 (1987).

*Primary Examiner*—Paul M. Dzierzynski
*Assistant Examiner*—Kim-Kwok Chu
*Attorney, Agent, or Firm*—Fitzpatrick, Cella, Harper & Scinto

[57] ABSTRACT

An information processor comprises a plurality of probes disposed so as to face to a recording medium containing an information, and a plurality of elastic members such as cantilevers supporting the respective probes. The processor reads the information by detecting each displacement of the elastic members. For the detection of displacement, the processor has an optical system for radiating a scanning light beam to the elastic members together with an optical system for detecting a reflected light from the elastic members, or alternatively has a means for detecting each displacement individually such as optically integrated optical members or piezoelectric layers provided to the elastic members.

17 Claims, 5 Drawing Sheets

ATOMIC FORCE MICROSCOPE WITH A PLURALITY OF CANTILEVERS FOR RECORDING/REPRODUCING INFORMATION

BACKGROUND OF THE INVENTION

1. Field of the Invention

The present invention relates to an information processor having a high density and a large capacity.

2. Related Background Art

In an atomic force microscope (hereinafter referred to as "AFM") which is a new type of microscope invented in recent years, a cantilever, (an elastic member) supporting a probe which is brought close (i.e. within a distance 1 nanometer or less) to the surface of a sample, is deflected by a force generated between the sample and the probe. This force is conversely measured from the deflection, and the surface of the sample is then scanned, while the distance between the sample and the probe is controlled so that the force may be constant, thereby observing the three-dimensional shape of the surface with a resolution of a nanometer or less [Binnig et al., Phys. Rev. Lett. 56, 930, (1986)]. The sample to which AFM can be applied does not have to be conductive, in contrast to a sample for a scanning tunneling microscope (hereinafter referred to as "STM"). According to AFM, an insulating sample, particularly a semiconductor resist surface or a biopolymer, can be observed in an atomic/molecular order, and so it is expected that AFM will be utilized in many fields. As systems for detecting the deflection of the cantilever, there have heretofore been an optical lever method which entails radiating light from the back side of the cantilever, measuring a position deviation of its reflected light spot, and then calculating the lever deflection from the measured position derivation; and a tunnel current method which comprises bringing a conductive probe close to the back surface of the cantilever, controlling the position of the conductive probe so that the tunnel current flowing therebetween may be constant, and then calculating the cantilever deflection from a control variable.

One information processor to which AFM is applied is a high-density large-capacity information processor. This is one of reproduction methods corresponding to a high-density large-capacity recording process in which the shape of a recording medium surface is locally changed. This kind of high-density large-capacity information processor utilizes the principle of the above-mentioned AFM, and in this processor, the cantilever, supporting the probe brought close to the site where the shape change locally occurs, is deflected under the influence of a force generated between the local site and the probe. The deflection is then detected, whereby the reproduction is carried out. Furthermore, as a similar apparatus, there has been suggested a recording detector in which the principle of AFM is applied to the position control of the probe in the high-density large-capacity information processor having the principle of STM.

However, in the case that one probe (a probe electrode) for the reproduction is used in each of the above-mentioned conventional examples, a long period of time is taken for the reproduction and therefore their practicality is limited. Accordingly, it is essential to use multiple probes. However, in the conventional method for detecting the deflection of the cantilever supporting the probe, the constitution of the apparatus is enlarged and the use of multiple probes is difficult.

SUMMARY OF THE INVENTION

The present invention is directed to a high-density large-capacity information processor in which a plurality of probes are used to locally change the shape of a recording medium surface, whereby recording is achieved, and this change is determined by detecting a force generated between the plural probes and the medium surface, whereby reproduction is achieved. Furthermore, in the processor of the present invention, a displacement detecting means for elastic members which are force-displacement transducers each supporting a probe is miniaturized, so that the whole of the apparatus is made small-sized. For the achievement of this miniaturization, (1) a light beam scanning mechanism is added to a conventional displacement detecting means for elastic members using the light beam, and (2) the displacement miniaturized/integrated and unified into the elastic members by using an optical integration technique and a micromachine technology.

Thus, an aspect of the present invention is to provide an information processor which comprises a plurality of probes disposed so as to face a recording medium containing an information, and a plurality of elastic members supporting said plurality of probes, respectively, and which detects each displacement of said elastic members to read the information;

said information processor being characterized by having an optical scanning system for irradiating a the plurality of elastic members with a light beam and a light detecting means for detecting a reflected light from said elastic members in order to calculate the displacement on the basis of output signals from the light detecting means.

Another aspect of the present invention is to provide an information processor which comprises a plurality of probes disposed so as to face a recording medium containing an information, a plurality of elastic members supporting said plurality of probes, respectively, and displacement detecting means for detecting each displacement of said elastic members and which detects the displacement of each elastic member to read the information;

wherein the (information processor is characterized in that the displacement detecting means is disposed as many as the plural number, corresponding to the respective elastic members.

DESCRIPTION OF THE PREFERRED EMBODIMENTS

Now, the present invention will be described in more detail in reference to examples.

EXAMPLE 1

Figure 1:
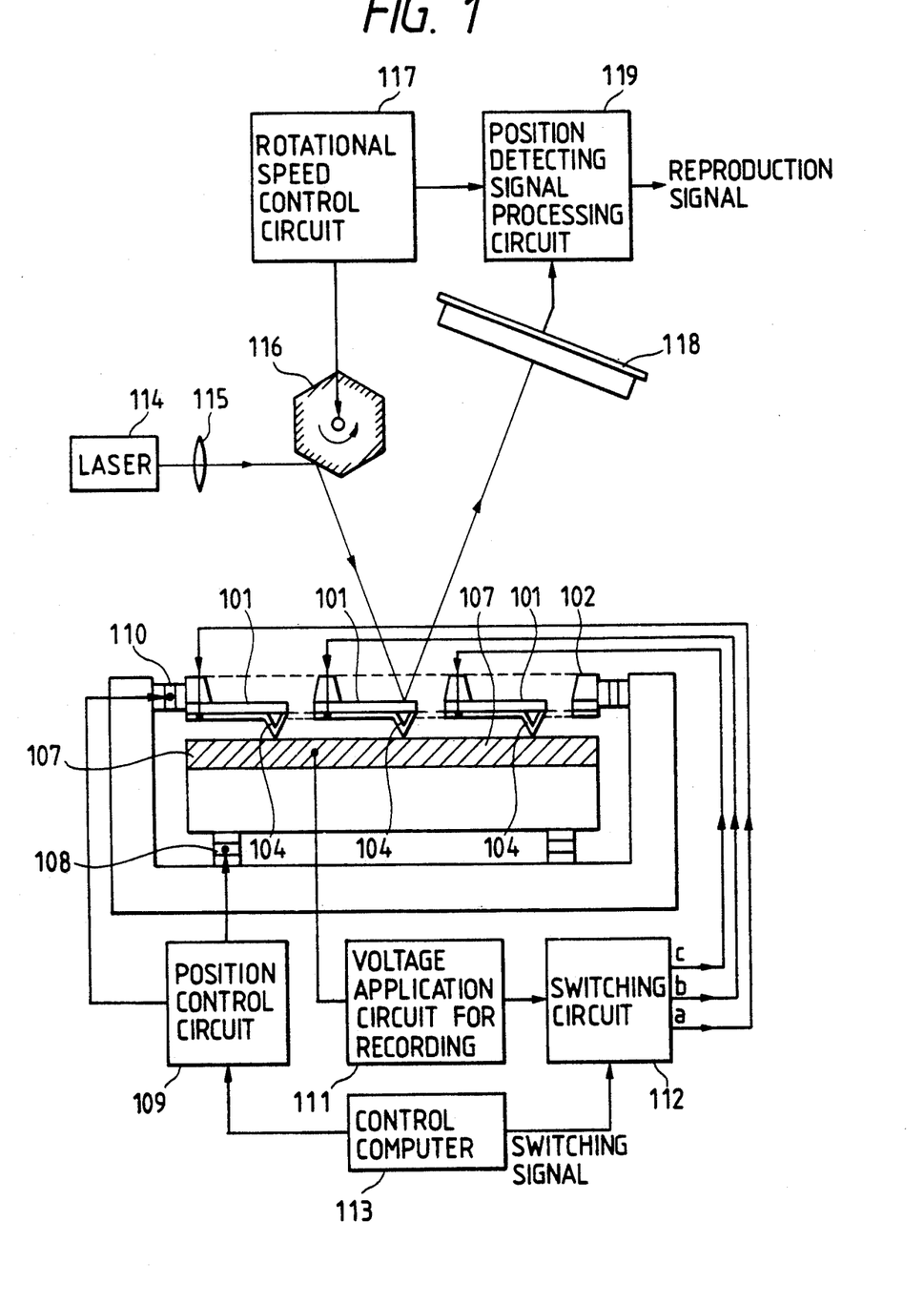
FIG. 1 is a constitutional view of a recording/reproducing device regarding the first embodiment of the present invention.

FIG. 1 shows the first example of the present invention. In FIG. 1, a plurality of conductive probe electrodes 104 supported by a plurality of cantilevers 101 comprising elastic members are disposed in the vicinity of a recording medium 107 so as to face the medium 107.

The multi-cantilevers 101 having the probe electrodes 104 which can be used herein can be formed as follows:

An $SiO_2$ film having a thickness of 0.3 $\mu$m is produced on the surface of an Si substrate by thermal oxidation, and a multi-cantilever shape having a length of 100 $\mu$m and a width of 20 $\mu$m is then patterned thereon. Next, an electric signal wiring pattern to probe electrodes is formed thereon, followed by anisotropic etching from the back surface of the substrate with a KOH solution to form the desired multi-cantilevers. Successively, probe electrodes having a height of 5 $\mu$m are disposed at the tips of the cantilevers in accordance with an electron beam deposition method using carbon or the like. The elastic constant to the deflection of each tip of the thus prepared multi-cantilevers is about 0.01 N/m. In view of the warp of the respective cantilevers and the non-uniform heights of the probe electrodes which result from process error and the like, the unevenness of the heights of the probe electrodes on the basis of a multi-cantilever supporting member 102 is about 1 $\mu$m. Furthermore, the undulation of the recording medium surface is required to be about 1 $\mu$m or less.

When the recording medium 107 is brought close to the plurality of probe electrodes 104 by a lengthwise driving element 108, the recording medium 107 applies a force to the nearest probe electrode, next the second nearest probe electrode, . . . , and finally the farthest probe electrode of the plurality of probe electrodes 104. Here, the probe electrode to which the force is applied by the medium and the strength of the applied force can be determined by detecting the deflection of the respective cantilevers (a manner for detecting the deflection of the cantilevers will be described hereinafter). That is, when the medium reaches a position 1 nanometer or less distant from the certain probe electrode, the force is generated between the medium and the probe electrode, and by this functional force, the cantilever which is the elastic member for supporting the probe electrode is deflected. This deflection is directly proportional to the strength of the functional force. Therefore, in bringing the recording medium 107 close to the probe electrodes 104, a space between the multi-cantilever supporting member 102 and the recording medium 107 and the gradient of these members 102 and 107 are adjusted by the use of the lengthwise driving element 108, while the deflection of the respective cantilevers is detected, whereby the unevenness of the functional force can be limited in a certain range in the situation where the functional force is generated between all of the probe electrodes and the recording medium. In the previous case where (the elastic constant of the cantilever 0.01 N/m, and the height unevenness of the probe electrodes is 1 $\mu$m), the range of its unevenness is 0.01 N/m $\times$ 1 $\mu$m $= 10^{-8}$ N. Here, in order to further decrease the unevenness of the force generated between the respective probe electrodes and the recording medium, in the case that the height unevenness of the probes is constant, it is necessary to decrease the elastic constant of the cantilevers, that is, to increase the length of the levers, or to decrease the thickness of the lever film. According to this constitution, in bringing the plurality of probe electrodes close to the recording medium, the strength of the force generated between the respective probe electrodes and the recording medium can be made uniform within a certain range and can be decreased so as to be in the range. Thus, even if the materials of the recording medium and the probe electrodes are such as to be easily broken by the force generated between the probe electrodes and the recording medium, the above-mentioned method can prevent the applied force from reaching or exceeding the breakage threshold value, so that the recording medium and the probe electrodes can be protected from breakage during recording and reproducing.

A recording process will be described which is carried out by the probe electrodes 104 brought close to the recording medium 107 in the above-mentioned way.

A horizontal position control signal is applied from a position control circuit 109 to a horizontal driving element 110, and the tip of the probe electrode 104 is moved to a desired position on the recording medium 107 at which recording should be made. A recording voltage signal from a voltage application circuit 111 for recording is applied to the probe electrode 104 selected by a switching circuit 112. Here, as the recording medium, there can be used one such as to bring about a local shape change by the local application of voltage, electric field, or current.

Examples of the recording medium include thin films of metals and metallic compounds, and typical examples include Au, Al, a Rh-Zr alloy mentioned in Appl. Phys. Lett. 51, 244(1987) (Staufer et al.), a Te-Ti alloy, a Te-Se alloy, and Te-C, H type materials, and semiconductor thin films such as amorphous silicon and the like. On the other hand, examples of the material of the probe electrodes include tungsten, Pt-Ir and Pt. Furthermore, there may be used an etching process which entails applying a voltage pulse onto the graphite surface, as shown in Appl. Phys. Lett. 55, 1727 (1989) [Albrecht et al.].

Next, reference will be made to a procedure for reproducing the information which is thus recorded as the local shape change on the recording medium. A light beam from a laser 114 is collected by a lens 115, and then allowed to fall upon a rotating polygonal mirror 116. The rotational speed of the polygonal mirror 116 is controlled by a rotational speed control circuit 117, and as the polygonal mirror 116 is rotated, the reflected beam of the above-mentioned incident light beam scans the back surface of each of the plural cantilevers 101. At this time, when the mirror surface of the polygonal mirror 116 is inclined from the direction vertical with reference to the paper surface of FIG. 1, not only the cantilevers arranged in a horizontal direction on the paper surface of FIG. 1 but also the cantilevers arranged in the vertical direction can be scanned. The position of the reflected light beam from the back surface of the cantilever is detected by a position detecting element 118. Now, assuming that the length of the cantilever is represented by l and the distance between the back surface of the cantilever and the position detecting element is represented by L, if the tip of the cantilever is deflected as much as Δz, the position of the light spot of the reflected light beam from the back surface of the cantilever on the position detecting element 118 deviates as much as a distance of $$\frac{2L}{l} \Delta z.$$

The deflection (displacement) of the tip of each cantilever can be determined by detecting the deviated position of the light spot on the basis of the signal from the position detecting element 118 by a position detecting signal processing circuit 119. Here, the scanning can be carried out with the light beam by the polygonal mirror 116, and the deflection Δz of the tip of each of the plural cantilevers 101 can be detected on the basis of the signal from the rotational speed control circuit 117 by time sharing.

The surface of the recording medium 107 is two-dimensionally scanned by the plurality of probe electrodes 104, and when the probe electrode reaches a recording position, the local shape change in the medium leads to a change in the force which the probe electrode 104 receives from the recording medium 107, thus changing the deflection of the cantilever 101 supporting the probe electrode 104. This change of the deflection is successively detected for each of the plurality of cantilevers 101 by time sharing, whereby recorded bits are detected, i.e., they are reproduced.

EXAMPLE 2

Figure 2:
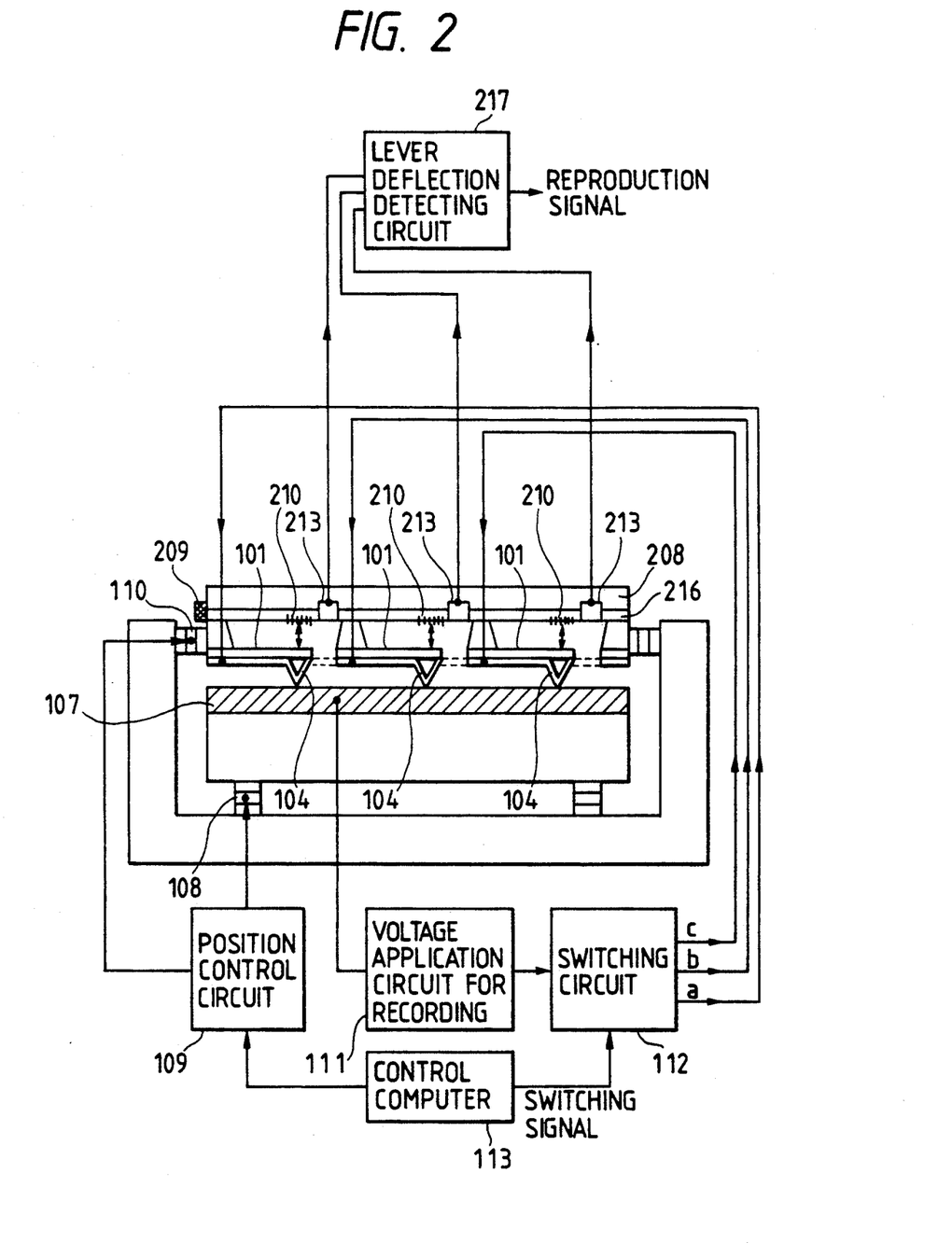
FIG. 2 is a constitutional view of a recording/reproducing device regarding the second embodiment of the present invention.

FIG. 2 shows the second embodiment of the present invention. In FIG. 2, the arrangement of the multi-cantilevers 101, the approach way of the recording medium 107 to the plurality of probe electrodes 104, the recording way and the recording medium are the same as in Example 1. The distinctive features of the present example reside in a deflection detecting manner (i.e., reproduction) of the multi-cantilevers 101 and a constitution of the detection means. They will be described.

An optically integrated deflection sensor 208 for detecting the deflection of each lever is integrally attached to the back surface of the multi-cantilevers 101. The optically integrated deflection sensor 208 is mainly composed of a semiconductor laser 209, an optical waveguide 216, a grating coupler 210 which is an optical path modulating element, and a photodiode 213, and the deflection of each cantilever 101 is detected on the basis of an output of the corresponding photodiode 213 by a lever deflection detecting circuit 217. Since the deflection detecting system is compactly integrated with the cantilevers, the positioning of the respective cantilevers with respect to the deflection detecting system is not necessary any more, and operating efficiency can be improved. In addition, the whole of the apparatus can be miniaturized, and the influence of an outer turbulence can be inhibited. In consequence, the detection resolution can be improved, and the reliability of the recording/ reproducing apparatus can be also improved.

Figure 3:
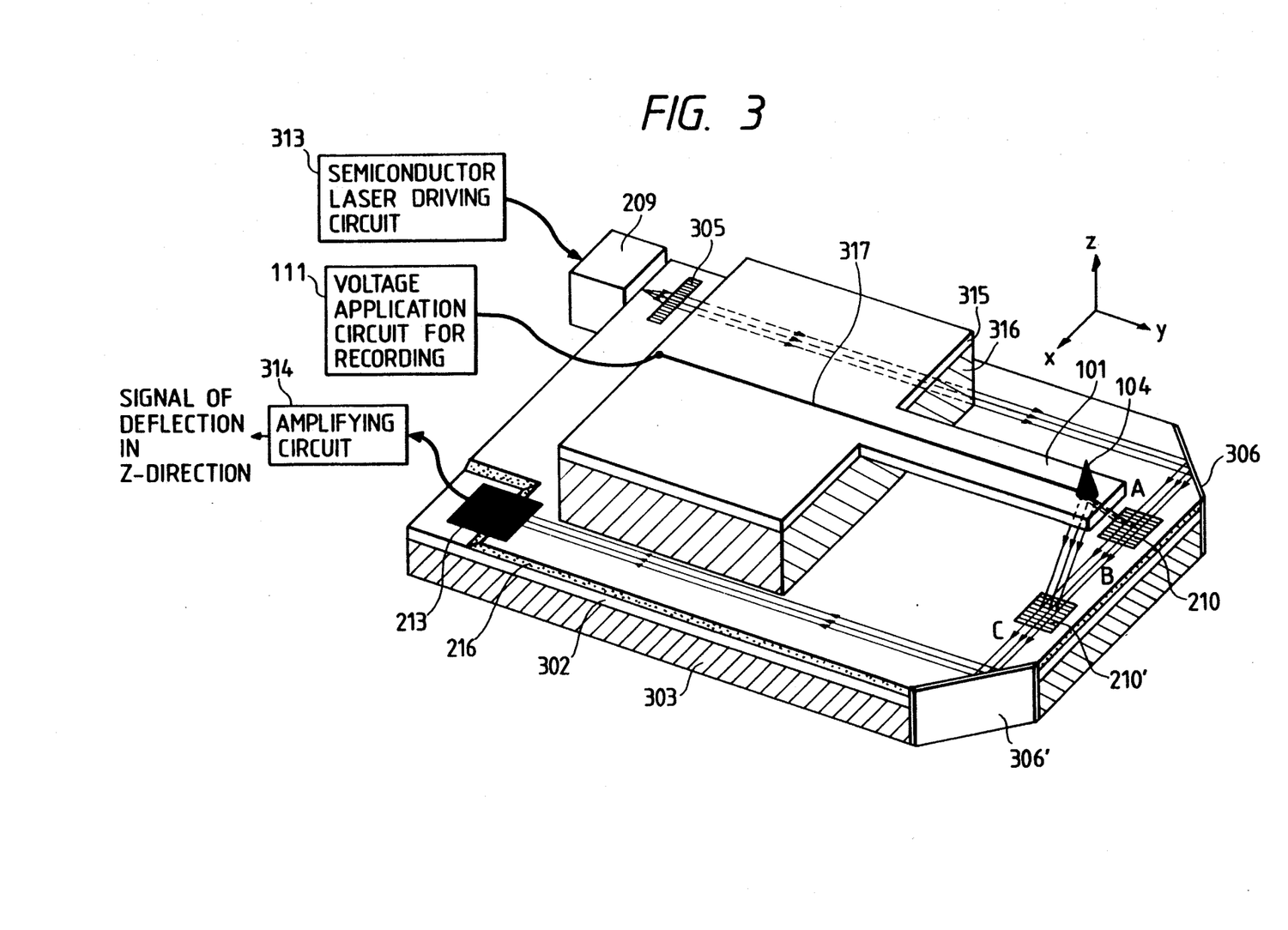
FIG. 3 is a constitutional view of an optically integrated cantilever deflection sensor in the second embodiment of the present invention.

Next, reference will be made to the composition, and preparation process of the optically integrated deflection sensor. In FIG. 3, a semiconductor laser 209, attached to one edge of an SiO$_2$ 302/Si 303 substrate provided on the surface thereof with a thin film optical waveguide 216, is driven by a semiconductor laser driving circuit 313 to introduce the laser light into the optical waveguide 216. The introduced laser light is collimated by a Fresnel lens 305 and then reflected by a reflecting mirror 306 to fall upon the grating coupler 210. A part of the light is taken out from the optical waveguide on the grating coupler 210 as shown by A, reflected on the back surface of the cantilever 101, returned to the optical waveguide on a grating coupler 210', and then synthesized with a light B delivered straight through the optical waveguide. The thus synthesized light C is reflected on a reflecting mirror 306', and then detected by the photodiode 213. Now, the probe electrode 104 formed on the cantilever 101 detects the force generated between the probe electrode 104 and the recording medium, and the tip of the cantilever 101 is deflected in the direction of z in the drawing. At this time, in accordance with its deflection Δz, the optical path length of the light A between the grating coupler 210 and the grating coupler 210' changes. Assuming that this change is represented by Δd, an optical path difference between the light A, taken out from the optical waveguide, and the light B, delivered straight through the optical waveguide, changes by $$\Delta d = \frac{2}{\cos\theta} (1 - n \cdot \sin\theta) \Delta z$$

(wherein θ is an angle made by the normal to the surface of the optical waveguide and the emitting light A, and n is a refractive index of the optical waveguide), so that the light intensity of the synthesized light C changes. Therefore, the detection of this light intensity change permits determining the deflection Δz of the tip of the cantilever 101 in the z direction. This light intensity change signal is amplified by an amplifying circuit 314 to obtain a z-direction deflection signal.

Now, the preparation process of this kind of optically integrated cantilevers will be described.

A PN photodiode 213 is formed on the Si substrate 303 by a usual silicon process, and an Si$_3$N$_4$ protective film having a thickness of 0.1 μm is then formed thereon by an LPCVD method. Next, an SiO$_2$ film 302 having a thickness of 2.5 μm is formed on another opening by thermal oxidation, and the Si$_3$N$_4$ film is then removed by plasma etching. Successively, a glass thin film waveguide 216 having a thickness of 2 μm which comprises 7059 Glass made by Corning Co., Ltd. is formed on the SiO$_2$ film, and a Fresnel lens 305 and the grating couplers 210 and 210' are prepared in the waveguide by the utilization of a refractive index change by ion exchange or ion injection. Here, another Si substrate 316 having an SiO$_2$ film 315 thereon is patterned into a cantilever shape, and after the formation of an A1 wiring 317 and the probe electrode 104, a chip having the multi-cantilevers formed by anisotropic etching is mounted on the glass thin film waveguide by anodic bonding. After cleavage and polishing, a metal such as A1 is vapor deposited on edges of the chip to provide the reflecting mirrors 306 and 306', and the semiconductor laser 209 is attached to the another edge of the chip.

EXAMPLE 3

Figure 4:
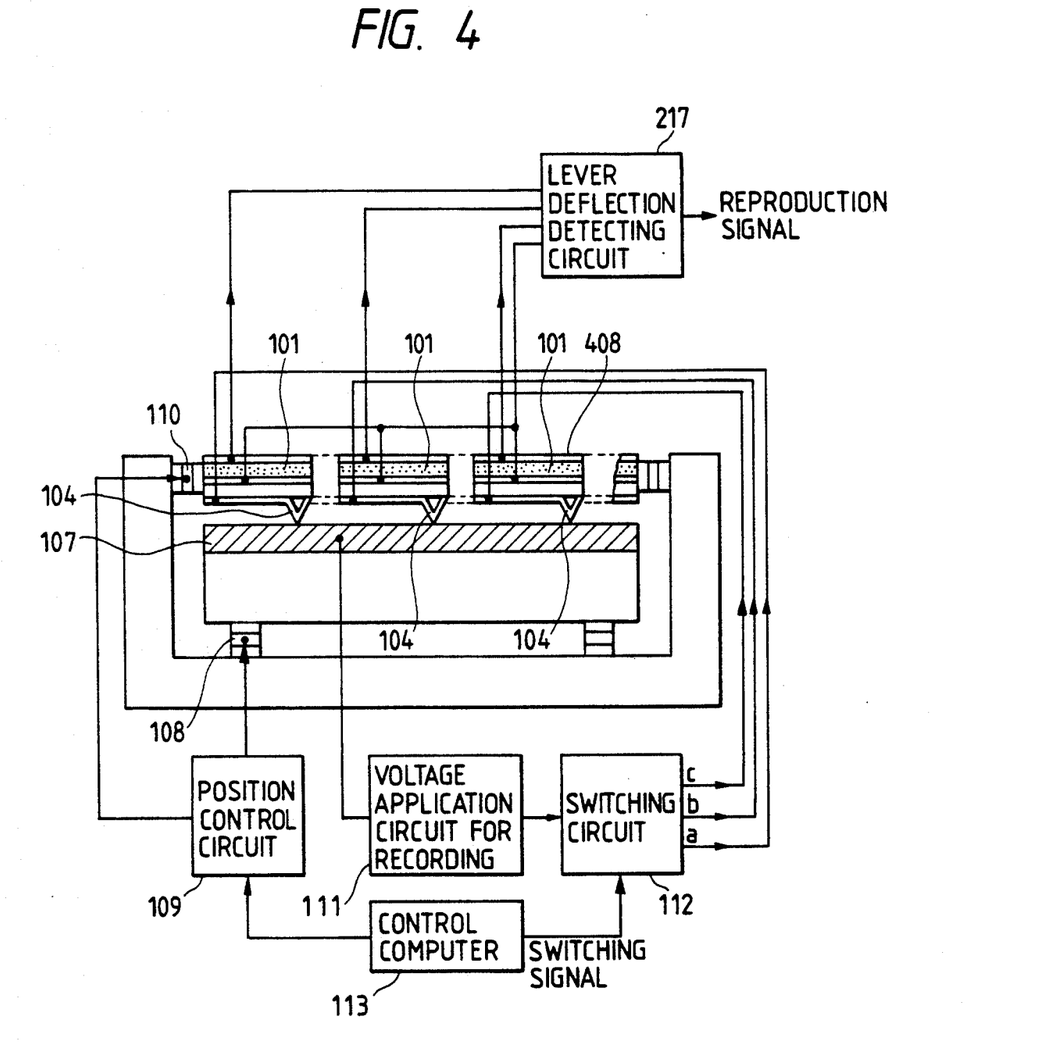
FIG. 4 is a constitutional view of a recording/reproducing device regarding the third embodiment of the present invention.

FIG. 4 is a drawing showing the third example of the present invention. In FIG. 4, the arrangement of the multi-cantilevers, the approach way of the recording medium 107 to the plurality of probe electrodes 104, the recording way and the recording medium are the same as in Example 1. The distinctive features of the present example reside in a deflection detecting manner (i.e., reproduction) of the multi-cantilevers 101 and the composition of the detection means. They will be described.

Figure 5:
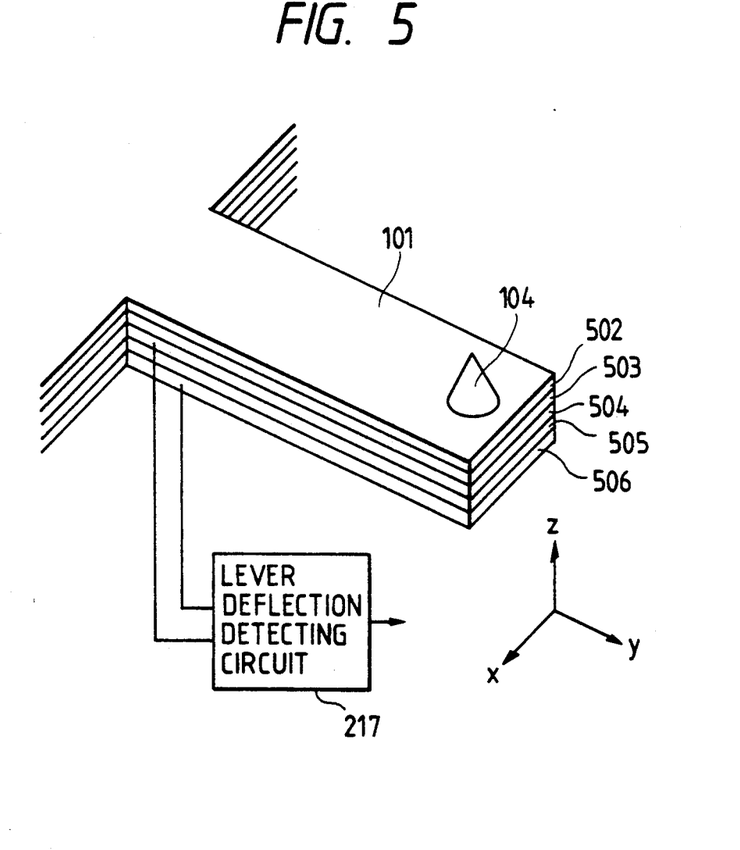
FIG. 5 is a constitutional view of an integrated piezoelectric unimorph cantilever deflection sensor in the third embodiment of the present invention.

Deflection sensors 408 each comprising metallic electrodes and a piezoelectric layer sandwiched therebetween are integrally mounted on the back surfaces of the respective cantilevers 101. Each deflection sensor 408 has a piezoelectric unimorph structure associated with a constitutional member of the cantilever, as shown in FIG. 5. The probe electrode 104 detects the force generated between the probe electrode 104 and the recording medium 107, so that the tip of the cantilver 101 deflects in the z direction in the drawing. In accordance with its deflection $\Delta z$, the piezoelectric layer 505 strains, with the result that a potential difference takes place between the Au electrodes 504 and 506. For example, when the cantilever 101 has a length of 100 $\mu$m and a width of 20 $\mu$m and when the Au electrode 502, an $SiO_2$ layer 503, the Au electrode 504, the piezoelectric layer (ZnO) 505 and the Au electrode 506 are 0.1 $\mu$m, 1 $\mu$m, 0.1 $\mu$m, 1 $\mu$m and 0.1 $\mu$m thick, respectively, and if the deflection $\Delta z$ of the cantilever is 1 nm, a potential difference of about 1 mV is generated. Therefore, the deflection of the cantilever tip can be determined by detecting this potential difference by the lever deflection detecting circuit 217.

Now, reference will be made to the preparation method of such piezoelectric unimorph cantilevers. While the Si substrate is successively patterned into cantilever shapes thereon, the Au thin film (thickness 0.1 $\mu$m) is formed by a vapor deposition method and the ZnO thin film (thickness 1 $\mu$m) and the $SiO_2$ thin film (thickness 1 $\mu$m) are formed by a sputtering method so as to be alternately laminated. Afterward, a conductive material is vapor deposited by an electron beam deposition method to prepare probe electrodes. In the final step, an anisotropic etching is carried out by the use of KOH from the back surface of the substrate to form the desired cantilevers.

As described above, the information processor having a high reliability can be achieved by attaching a light beam scanning mechanism for detecting deflections of a plurality of cantilevers, or by integrating a deflection detecting means by an optical integration technique or a micromachine technology into each of the cantilevers, whereby the deflections of plural cantilvers can be detected without enlarging the whole apparatus, and the reproduction time can be shortened.

What is claimed is:

1. An information processor comprising:
   a plurality of probes disposed so as to face a recording medium containing recorded information;
   a plurality of elastic members supporting said plurality of probes, respectively, said elastic members being susceptible to displacement, said displacement being indicative of said recorded information;
   an optical scanning system for irradiating said plurality of elastic members with a light beam; and
   a light detecting means for detecting a reflected light from said elastic members, wherein
   said information processor reads said information by calculating said displacement of each of said elastic members on the basis of output signals from said light detecting means.

2. The information processor according to claim 1, further comprising means for applying a voltage between said medium and said probes.

3. The information processor according to claim 1, wherein said optical scanning system includes a laser light source and a polygonal mirror.

4. The information processor according to claim 1, wherein said probes are arranged close to said medium so that a functional force may be generated between said medium and said probes.

5. An information processor comprising
   a plurality of probes disposed so as to face a recording medium containing recorded information;
   a plurality of elastic members supporting said plurality of probes, respectively, said elastic members being susceptible to displacement, said displacement being indicative of said recorded information; and
   displacement detecting means for detecting said displacement of each of said elastic members so as to read said information, wherein
   said displacement detecting means includes plural sensing portions corresponding to the respective elastic members.

6. The information processor according to claim 1 or 5, further comprising a signal processing circuit.

7. The information processor according to claim 1 or 5, wherein each of said elastic members is a cantilever made of a laminate of an Si substrate and an $SiO_2$ layer.

8. The information processor according to claim 5, wherein said displacement detecting means is integrated with each of said elastic members.

9. The information processor according to claim 5, wherein said displacement detecting means includes a light source, an optical waveguide, a waveguide type optical path modulating element and a light detecting element.

10. The information processor according to claim 9, wherein said light source is a semiconductor laser.

11. The information processor according to claim 9, wherein said light detecting element is a photodiode.

12. The information processor according to claim 5, further comprising means for applying a voltage between said medium and said probes.

13. The information processor according to claim 5, wherein the probes are arranged close to said medium so that a functional force may be generated between said medium and said probes.

14. The information processor according to claim 5, wherein said sensing portions comprise deflection sensors.

15. The information processor according to claim 5, wherein said displacement detecting means is a means in which a plurality of optical members are optically integrated.

16. The information processor according to claim 5, wherein each said sensing portion comprises a piezoelectric material sandwiched between a pair of electrodes and detects deflection as an electric potential difference generated by the deflection of the piezoelectric material.

17. The information processor according to claim 16, wherein each said sensing portion has a piezoelectric unimorph structure.

* * * * *

UNITED STATES PATENT AND TRADEMARK OFFICE
CERTIFICATE OF CORRECTION

PATENT NO. : 5,260,926

DATED : November 9, 1993

INVENTOR(S) : RYO KURODA, ET AL.

It is certified that error appears in the above-identified patent and that said Letters Patent is hereby corrected as shown below:

ON TITLE PAGE

In [56] References cited, under OTHER PUBLICATIONS, insert:

--Albrecht et al., "Nanometer Scale/Hole Formation on Graphite Using a Scanning Tunneling Microscope," *Applied Physics Letters*, Vol. 55, No. 17, p. 1727 (1989).--.

COLUMN 2

Line 26, "an" should be deleted.
Line 32, "a" should be deleted.
Line 41, "an" should be deleted.
Line 47, "(information" should read --information--.
Lines 48-49, "as many as the plural number, corresponding to the re-" should read --by the displacement detecting means being provided in a number equal to and corresponding to the re- --.

COLUMN 3

Line 49, "the certain" should read --a certain--.
Line 65, "where (the" should read --(where the-- and "cantilever" should read --cantilever is--.
Line 67, "its" should be deleted.

COLUMN 6

Line 36, "cantilevers" should read --cantilever--.
Line 52, "A1" should read --Al--.
Line 56, "A1" should read --Al--.

--

UNITED STATES PATENT AND TRADEMARK OFFICE
CERTIFICATE OF CORRECTION

PATENT NO. : 5,260,926
DATED : November 9, 1993
INVENTOR(S) : RYO KURODA, ET AL.

It is certified that error appears in the above-identified patent and that said Letters Patent is hereby corrected as shown below:

COLUMN 6

Line 64, "approach way" should read --method of approach--.
Line 66, "recording way" should read --method of recording--.

COLUMN 7

Line 37, "an" should be deleted.

COLUMN 8

Line 11, "comprising" should read --comprising:--.

Signed and Sealed this

Fourteenth Day of June, 1994

Attest:

BRUCE LEHMAN

Attesting Officer    Commissioner of Patents and Trademarks